United States Patent [19]

Blaushild

[11] Patent Number: 4,980,117
[45] Date of Patent: Dec. 25, 1990

[54] REACTOR VESSEL O-RING SPRING CLIP

[75] Inventor: Ronald M. Blaushild, Export, Pa.

[73] Assignee: Westinghouse Electric Corp., Pittsburgh, Pa.

[21] Appl. No.: 192,030

[22] Filed: May 9, 1988

[51] Int. Cl.$^5$ .............................................. G21C 13/00
[52] U.S. Cl. .................................... 376/205; 403/327; 403/329; 403/405.1
[58] Field of Search ............... 403/405.1, 408.1, 409.1, 403/326, 327, 329, 11; 376/205, 203; 29/238–239, 282, 428; 248/146

[56] References Cited

U.S. PATENT DOCUMENTS

| | | | |
|---|---|---|---|
| 2,825,948 | 1/1954 | Parkin | 24/458 |
| 3,359,020 | 12/1967 | O'Donnell | 403/405.1 X |
| 3,436,107 | 4/1969 | Kardén | 403/405.1 X |
| 3,685,123 | 8/1972 | Frisch | 29/239 |
| 3,858,370 | 1/1975 | Halstead | 403/405.1 X |
| 3,916,944 | 11/1975 | Crawford et al. | 248/146 |
| 4,046,169 | 9/1977 | Pollono et al. | 248/58 |
| 4,289,582 | 9/1981 | Parr et al. | 248/551 |
| 4,324,619 | 4/1982 | Guerin | 248/901 |
| 4,343,497 | 8/1982 | Bot | 285/61 |
| 4,637,914 | 1/1987 | Boyle et al. | 376/463 |

Primary Examiner—Randolph A. Reese
Assistant Examiner—Franco S. Deliguori
Attorney, Agent, or Firm—Michael G. Panian

[57] ABSTRACT

A reactor vessel O-ring spring clip designed to hold the tubular O-ring in the groove of a reactor vessel head flange, especially during head lifting. The spring clip is designed such that the weight of the O-ring acts to increase the friction force between the spring clip and the, typically, threaded hole into which it is inserted. The end of the clip adapted to be inserted through a slot in the tubular O-ring for securement thereto has a circular member thereon which prevents the spring clip from becoming disengaged from the O-ring during head lifting.

13 Claims, 4 Drawing Sheets

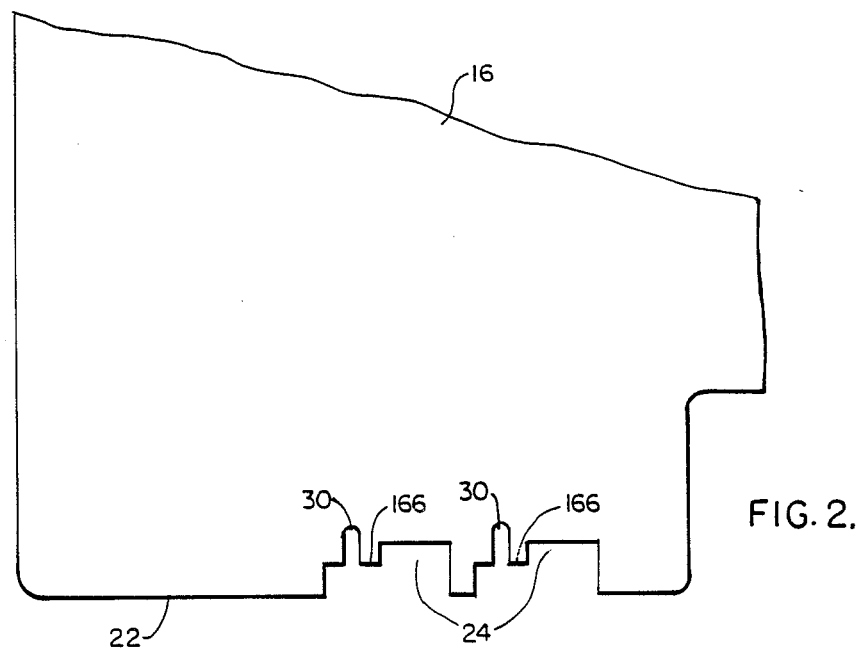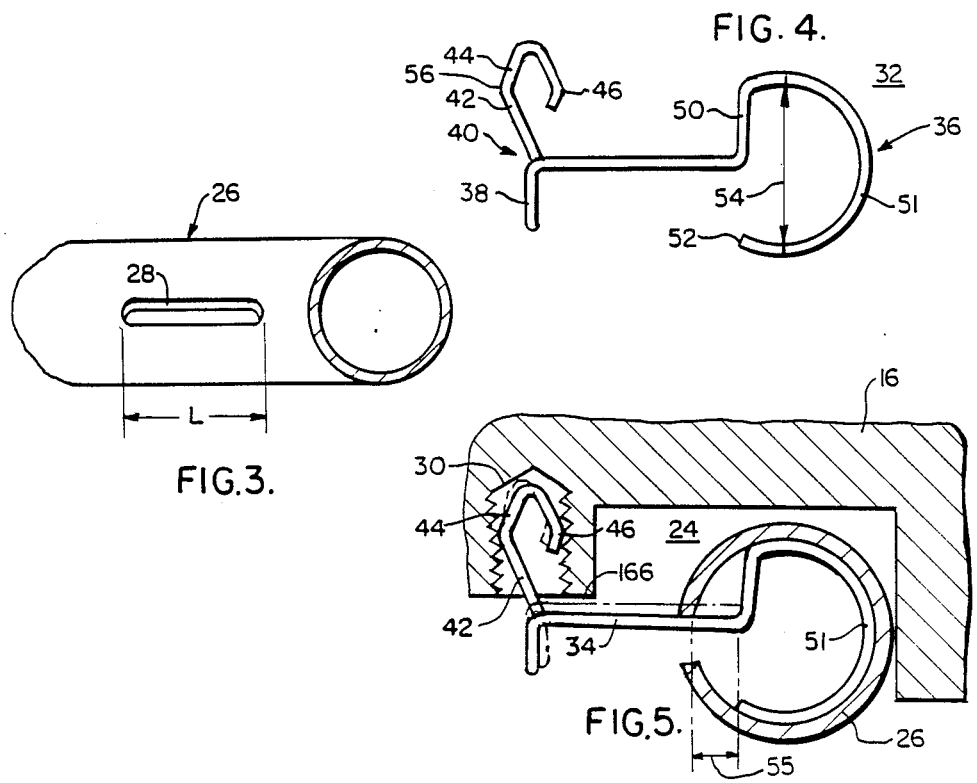

REACTOR VESSEL O-RING SPRING CLIP

TECHNICAL FIELD

The invention relates to nuclear reactor pressure vessels, and more particularly to an O-ring spring clip to secure the O-ring to the reactor vessel closure head.

BACKGROUND OF THE INVENTION

In a typical nuclear reactor system, and in particular a pressurized water reactor (PWR) which is well known in the art, the reactor vessel includes a removable upper head. Such a design provides sufficient access to the interior space of the reactor vessel for such purposes as refueling of the reactor core, as well as various other maintenance procedures. The vessel head is secured to the reactor vessel by a plurality of stud bolts and nuts installed around the circumference of the vessel head flange and cooperating with a reactor vessel flange. Since the reactor vessel is generally filled with a coolant, typically water, a leak-tight seal is provided between the cooperating surfaces of the vessel closure head flange and the reactor vessel flange.

In order to effectuate this seal, an exemplary design of a vessel closure head includes two hollow, metallic O-rings or gaskets situated within concentric grooves in the bottom surface of the closure head flange. These O-rings, or gaskets, typically are circular-type metal tubes which contain the internal pressure, as in a PWR, in cooperation with the bolted joint between the closure head and the reactor vessel. The outside diameter of the O-rings is generally larger than the depth of the groove within the bottom surface of the closure head flange. In this manner, when the head is bolted to the vessel flange, the O-rings are somewhat flattened within the respective grooves by the relatively smooth and flat surface of the reactor vessel flange. Also, the O-rings are self-energized by permitting the internal pressure of the PWR to act on the inside of the O-rings through a plurality of slots within the O-ring. Thus, the double O-ring seal and flange design prevents leakage past the pair of O-rings; via the O-rings effectively closing off any spaces which may be present between the cooperating surfaces of the respective flanges.

To attach the O-rings to the bottom surface of the vessel head flange, a plurality of clips are used. These clips are inserted through some of the slots within the O-rings. Concentric with each of the grooves are, typically, threaded holes, one set for each groove and O-ring, within which are threaded bolts to secure the clip and thus the O-ring to the vessel head flange. Whenever the reactor vessel is opened by removal of the closure head, such as for refueling, the O-rings are replaced. Because the O-rings are retained in the reactor vessel head by clips so that they will be removed with the head, they can be replaced outside the refueling cavity. Nonetheless, the undersurface of the vessel closure head defines an irradiated environment which may be hazardous to maintenance personnel. For this reason, it is desirable that the O-rings and clips be removable as quickly as possible. This will minimize the installation time and thus reduce the time that personnel must be present within an irradiated environment. Typically, sixteen clips are used for each O-ring to secure the O-ring to the vessel head flange. This means that thirty-two bolts and clips would need to be unscrewed, changed and installed again each time the reactor vessel is opened.

One way to minimize the installation and removal time required for the O-rings is to substitute springs for the bolts used to secure the clips to the vessel head. (An example of such is shown in FIG. 10.) One end of the, spring is inserted into the slot within the O-ring, while the other is inserted within the threaded hole. The force of friction between the spring and the threaded hole is intended to secure the spring within the hole and prevent slippage of the O-ring and spring from the bottom surface of the vessel head flange. When the vessel head is lifted out of engagement with the reactor vessel flange, gravity acts on the O-ring and pulls it downward. If the friction force between the spring clip and the threaded hole is not sufficient, the spring clips may have a tendency to slip from the holes and thereby become disengaged with the reactor vessel head flange and the O-ring. It is therefore desirable to have a means for securing the O-rings within the grooves of the reactor vessel closure head flange which will not become separated from the O-ring and/or the threaded hole.

DISCLOSURE OF THE INVENTION

It is therefore an object of the present invention to provide an O-ring spring clip which will not become separated therefrom when the vessel head is lifted from the reactor vessel.

It is another object of the present invention to provide a spring clip which is quick and simple to insert within the O-ring and the threaded hole.

It is a further object of the present invention to provide such a spring clip which prevents underinsertion thereof.

The above objects are attained by the present invention, according to which, briefly stated, a spring clip for securing an O-ring within an annular groove in a bottom surface of a vessel closure head adapted to be sealingly engaged to a nuclear reactor pressure vessel. The O-ring has a plurality of slots therein, and the vessel head has a plurality of threaded apertures in the bottom surface, and a reactor vessel O-ring spring clip for securing the O-ring to the vessel head is designed such that the weight of the O-ring increases the friction force between the clip and the threaded aperture. The spring clip is comprised of a horizontal leg having one end thereof adapted to be received within one of the slots within the O-ring. A U-shaped vertical leg depends downward from the other end of the horizontal leg, a diagonally oriented leg extends upward from the U-shaped vertical leg and is angled at a direction away from the one end of the horizontal leg. An inverted V-shaped leg extends from the diagonal leg so as to be angled at a direction back toward the one end of the horizontal leg, and has its end terminating at a vertical position above the plane of the horizontal leg and is adapted to frictionally engage one of the threaded apertures, such that the diagonal and V-shaped legs cooperate to frictionally secure the spring clip within one of the threaded holes, wherein a plurality of spring clips are used to secure the O-ring to the vessel head within the annular groove.

BRIEF DESCRIPTION OF THE DRAWINGS

The invention will become more apparent by reading the following detailed description in conjunction with the drawings, which are shown by way of example only, wherein:

FIG. 2 is a sectional side elevational view of a reactor vessel closure head flange showing the annular grooves therein;

FIG. 3 is a sectional view of a typical O-ring showing a slot therein;

FIG. 4, shows one embodiment of the present invention;

FIG. 5 shows the embodiment of the invention shown in FIG. 4 installed within the O-ring and vessel closure head;

DESCRIPTION OF THE PREFERRED EMBODIMENTS

Figure 1:
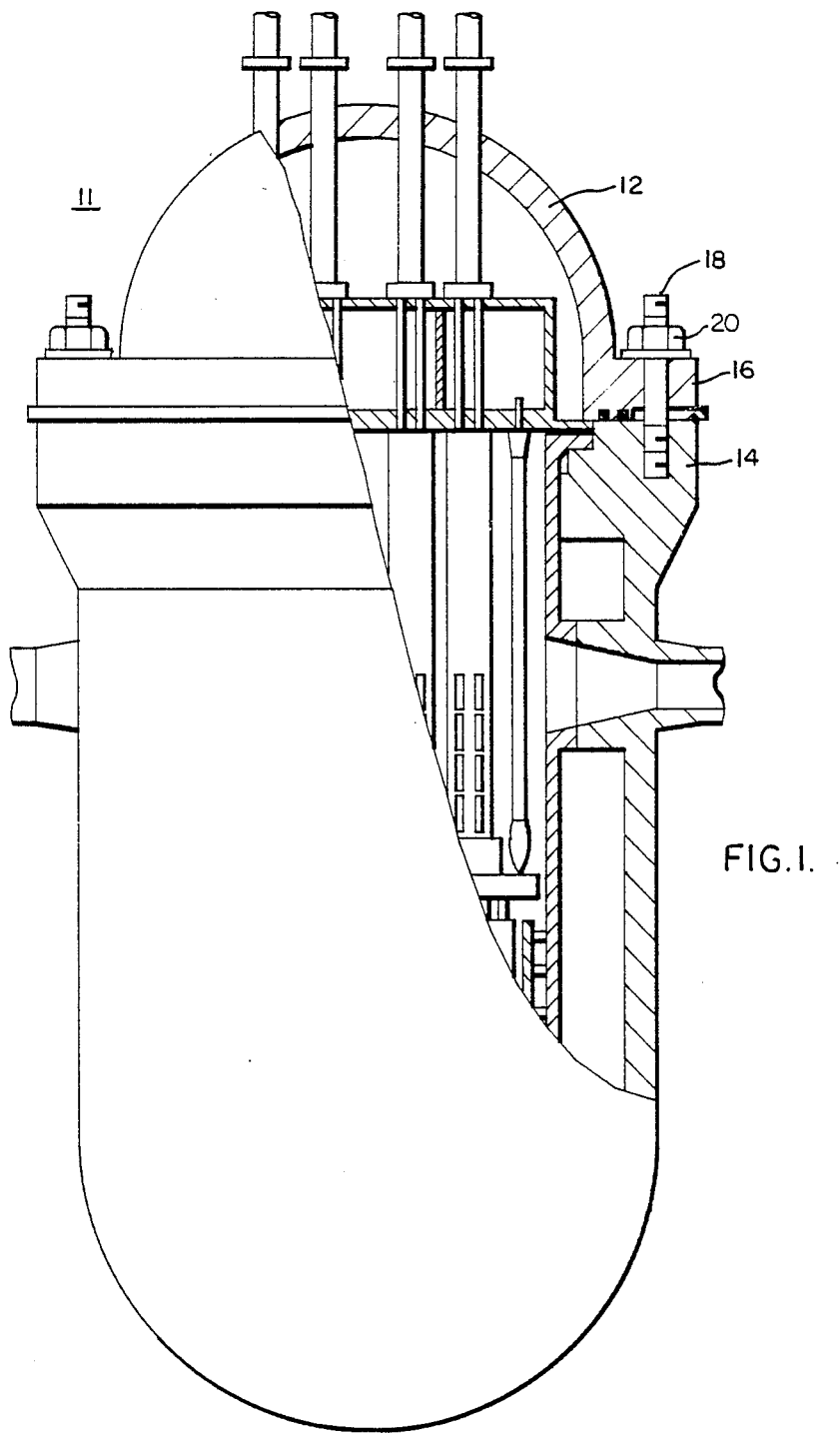
FIG. 1 is a side elevational view, partially in section, of an exemplary nuclear reactor vessel.

In a nuclear reactor, an example of which is a pressurized water reactor (PWR) and one design of such being shown in FIG. 1, a reactor vessel 11 is closed by means of a reactor vessel closure head 12 which is sealingly engaged therewith. A flange 14 on the reactor vessel 11 cooperates with a flange 16 on the vessel head 12 and is secured thereto by means of stud bolts 18 and nuts 20. On the lower surface 22 of the vessel head flange 16, as shown in detail in FIG. 2, are two annular grooves 24. Within these grooves 24 are situated O-rings 26, as shown in FIG. 3, which act to sealingly engage the vessel head 12 with the vessel 11 itself.

These O-rings 26, or gaskets, are circular-type metal tubes. Typically, two hollow, or tubular metallic O-rings 26 form a pressure-tight seal within the concentric grooves 24 in the bottom surface 22 of the vessel head flange 14. Typically, the outside diameter of the O-rings 26 are somewhat larger than the depth of the grooves 24 such that when the head 12 is sealingly engaged on the vessel 11, the O-rings 26 are deformed such that they form the pressure-tight seal. Additionally, the pressure within a PWR acts on the O-rings, through the slots 28 therein (see FIG. 3), to fully seal the vessel head flange 16 to the reactor vessel flange 14.

In order to secure the O-rings 26 within the grooves 24 of the vessel head flange 16, a plurality of clips, typically sixteen, are inserted within at least some of the slots 28 in the O-rings 26 and are secured within a threaded hole 30 concentrically disposed with respect to the annular groove 24. One embodiment of the present invention for securing an O-ring 26 within its respective groove 24 is shown in FIG. 4. By way of description only, with reference to FIG. 4, a spring clip 32 for attaching an O-ring 26 to the bottom surface 22 of a vessel head 12 within the groove 24 of the closure head flange 16 comprises a horizontal leg 34 having one end 36 thereof adapted to be received within one of the slots 28 within the O-ring, a U-shaped vertical leg 38 depends downward from the other, or opposite, end 40 of the horizontal leg 34. The U-shaped vertical leg 38 lies in a vertical plane perpendicular to that of the horizontal leg 34. Extending upward from the U-shaped vertical leg 38 is a diagonally oriented leg 42 which is angled at a direction away from the one end 36 of the horizontal leg 34 adapted to be secured to the O-ring 26. Additionally, an inverted V-shaped leg 44 extends from the diagonal leg 42 so as to be angled at a direction back towards the one end 36 of the horizontal leg 34, having its end 46 terminating at a vertical position above the plane of the horizontal leg 34 and adapted to frictionally engage one of the existing threaded apertures 30 concentric with the annular groove 24. Preferably, the terminating end 46 of the inverted V-shaped leg 44 is again angled back toward the diagonal leg 42. The configuration of the clip 32 is such that the diagonal leg 42 and the V-shaped leg 44 cooperate to frictionally secure the spring clip 32 within a threaded hole 30. Also, the weight of the O-ring 26 itself on the horizontal leg 34 causes the portion of the spring clip 32 within the hole 30 to open up to thereby increase the friction force between the threaded clip and the hole. A plurality of such spring clips 32, typically sixteen, are used to secure the O-ring 26 to the vessel head 12 within its annular groove 24. To secure two O-rings 26 each within their respective annular groove 24, a total of thirty-two such spring clips 32 would be utilized.

In the embodiment shown in FIG. 4, the one end 36 of the horizontal member 34 adapted to engage the O-ring 26 includes a generally vertical member 50 which extends upward from the one end 36 of the horizontal leg 34, and has a generally circular member 51 depending from the vertical member 50 such that it lies in a vertical plane parallel with the vertical plane in which the horizontal member 34 lies. In the figure, the circular member 51 extends in a rightward direction from the vertical leg 50 and curves back toward the horizontal member 34. The end 52 of the circular member 51 terminates at a horizontal point just short of the vertical leg 50. Additionally, the effective outer diameter 54 of the circular member 51 is somewhat greater than the inside diameter of the O-ring 26 such that compressive forces between the circular member 51 of the clip 32 and the O-ring 26 will partially close the circular member 51. This will affirm the spring clip's orientation with respect to the O-ring 26 and will prevent slippage between the O-ring and the clip. An adjustment gap 55, which is the distance between the wall of the O-ring 26 and the vertical member 50, allows for deformation of the O-ring when the vessel head 12 is sealingly engaged with the reactor vessel 11. This configuration of the end 36 of the horizontal member 34, which includes the second vertical leg 50 and the circular member 51, will allow the spring clip 32 to be deformed in the same manner as the O-ring 26 is deformed. Additionally, the spring clip 32 does not occupy the entire space of the slot 28 so that the internal pressure of the PWR can still act on the inside diameter of the O-ring 26 to energize the O-ring and sealingly engage the vessel head flange 16 with the reactor vessel flange 14.

FIG. 5 shows a spring clip 32 of the present invention engaged within the O-ring 26 and threaded hole 30 to secure the O-ring within the annular groove 24. When the weight of the O-ring 26 is fully imparted on the horizontal leg 34, such as when the reactor vessel head 12 is lifted out of engagement with the vessel 11, the weight of the O-ring 26 will cause the ends 46, 56 of the inverted V-shaped member 44 to be "opened up" within the threaded hole 30 pivoting about point 46. Thus, the weight of the O-ring 26 itself actually increases the friction force between the spring clip 32 and the threaded hole 30 and prevents the clip and the O-ring 26 from falling down from the vessel head flange 16. Also, the clip 32 is pivoted about the point 56 where the diagonal leg 42 is joined with the inverted V-shaped member 44, as shown in the figure, to provide an increased force at the point 46 where the inverted V-shaped member 44 terminates. Thus, the weight of the O-ring 26 operates to cause the portion of the spring clip within the threaded hole to open up as the weight of the O-ring is imparted on the horizontal member to thereby increase the friction force between the spring clip 32 and the aperture 30 and provide a secure means of holding the O-ring to the vessel head.

DESCRIPTION OF A SECOND EMBODIMENT

Figure 6A:
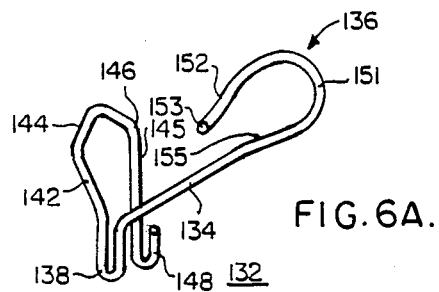
FIGS. 6A and 6B show two views of a second embodiment of the present invention.
Figure 6B:
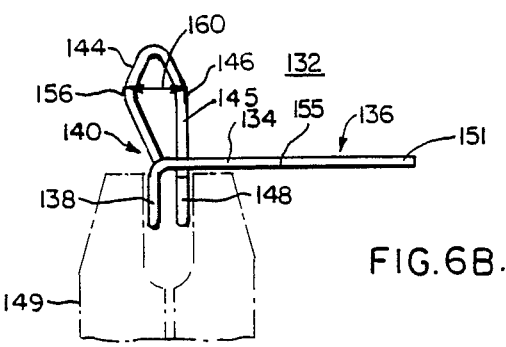
Figure 7:
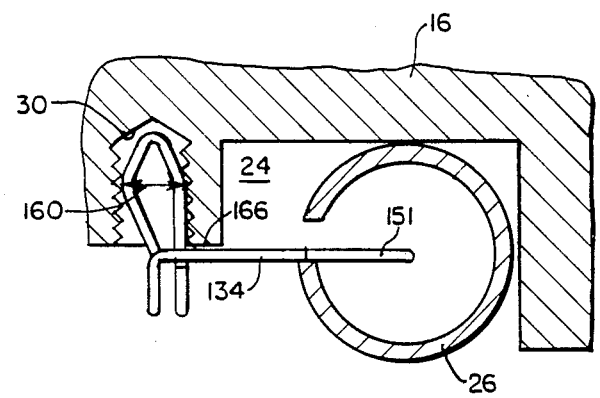
FIG. 7 is a representation of the embodiment shown in FIGS. 6A and 6B installed within the O-ring and the vessel closure head flange.

With reference to FIGS. 6A, 6B and 7, a second type of spring clip 132 for securing an object to the bottom surface of a structure can be seen. FIG. 6A is a perspective view of a second embodiment of the spring clip 132, and FIG. 6B is a profile view of the clip. In the second embodiment of the invention, a typical spring clip 132 for securing the O-ring 26 within the annular groove 24 of the vessel head 12 is comprised of a horizontal leg 134 having one end 136 thereof adapted to be received within one of the slots 28 within the O-ring 26, a first U-shaped vertical leg 138 depends downward from the opposite end 140 of the horizontal leg 136. A diagonal leg 142 extends upward from the first U-shaped vertical leg 134 and is angled at a direction away from the one end 136 of the horizontal leg 134 adapted to be secured to the O-ring 26. An inverted V-shaped leg 144 extends from the diagonal leg 142 in such a manner so as to be angled at a direction back toward the one end 136 of the horizontal leg 134, or back toward the O-ring 26. A vertical leg 145 depends downward from the end 146 of the inverted V-shaped leg 144 and terminates in a second U-shaped vertical leg 148 which is disposed generally parallel to the first U-shaped vertical leg 138 and is oriented with respect thereto such that the second U-shaped vertical leg 148 is positioned nearer the one end 136 of the horizontal leg 134, or the O-ring 28, than the U-shaped vertical leg (138) at the end 140 of the horizontal leg 134. In other words, viewing the horizontal plane in which the horizontal leg lies with respect to FIG. 6B, the one end 136 of the horizontal leg 134 adapted to be secured within the slot 28 of the O-ring 26 is on the farthest right point, the second U-shaped vertical leg 148 is disposed adjacent to the O-ring 26 on the left side thereof, and the first U-shaped vertical leg 138 is farther left of the second U-shaped vertical leg 148, whereby the diagonal leg 142 cooperates with the inverted V-shaped leg 144 and vertical leg 145 to frictionally secure the spring clip 132 within the threaded hole 30. Again, a plurality of such spring clips 132 are used to secure the O-ring 26 to the vessel head 12 within its respective annular groove 24.

The first 138 and second 148 U-shaped vertical legs, by being disposed generally parallel with respect to each other, provide an additional important feature designed to prevent improper installation of the clip 132 and O-ring 26 within the threaded hole 30 and the annular groove 24. Typically, since work is performed in an irradiated area, maintenance personnel may be wearing rubber gloves which may make it difficult to grasp a spring clip. Also, pliers 149 (shown in phantom) may be used to aid in the insertion of the clip within the threaded hole. To prevent inadequate or underinsertion, which would result in improper engagement of the clip inside the hole, the design of the horizontal leg of this spring clip will prevent the location of the pliers 149, or the operator's fingers, above the line of the clip-to-head flange contact (see reference numeral 166 in FIG. 7). The U-shaped members are disposed below the horizontal member such that the clip cannot be grasped above the horizontal member as it is inserted (see FIG. 7). Maintenance personnel, either by using finger force or pliers for installation and removal of the clip, can squeeze the U-shaped vertical members 138, 148 toward each other to easily insert the spring clip 132 within the threaded hole 30. After it has been fully inserted, the U-shaped vertical members 138, 148 are released such that the inverted V-shaped member 144 of the spring clip 132 expands within the hole 30 to be frictionally secured thereto. Such a design gives an additional certainty in the proper installation of the clip as well as minimizes the time for either the installation of new O-rings or the removal thereof, which results in less overall man-rem exposure to maintenance personnel.

Figure 9:
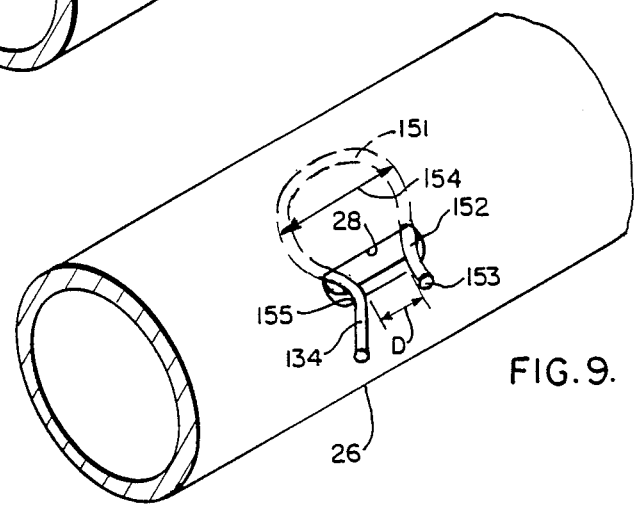
FIG. 9 is a representation of the invention of FIG. 8 installed within the O-ring.
Figure 10:
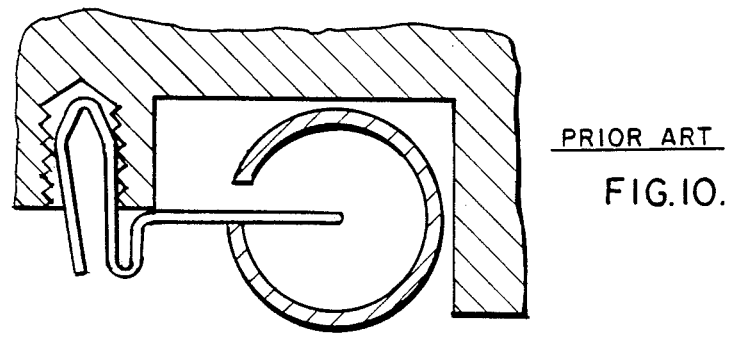
FIG. 10 is a representation of a typical prior art spring clip.

Additionally, this embodiment of the spring clip shows a differing means for securing the one end 136 of the horizontal leg 134 within the slot 28 of the O-ring 26. A generally circular member 151 depends from the one end 136 as well, but lies in the horizontal plane parallel with the horizontal leg 134 rather than a vertical plane, as in the first embodiment. (It should be understood that either end or circular member 51, 151 can be used on either spring clip 32, 132.) That is, the circular member 151 is essentially horizontally aligned with respect to the slot 28 in securing the O-ring 26 within the groove 24. The circular member 151 is oriented so as to curve back towards the horizontal leg 134. The end 152 of the circular member 151 has extending therefrom a second horizontal leg or member 153 angularly disposed with respect thereto, such that it is horizontally directed away from the horizontal leg 134. The shape of the circular member 151 is such that the distance from the ends thereof, designated at D, when in a relaxed position is at least as large as the length, L, of the slot 28; so that the effective outer diameter 154 of the circular member 151 is greater than the length L of the slot 28. Thus when the circular member 151 is inserted through the slot 28 and into the O-ring 26, the spring clip 132 is effectively captured therein; between the point 155 where the circular member 151 begins and depends from the horizontal leg 134 and the point 152 where the second horizontal member 153 depends from the opposite end thereof (see also FIG. 9).

Figure 8:
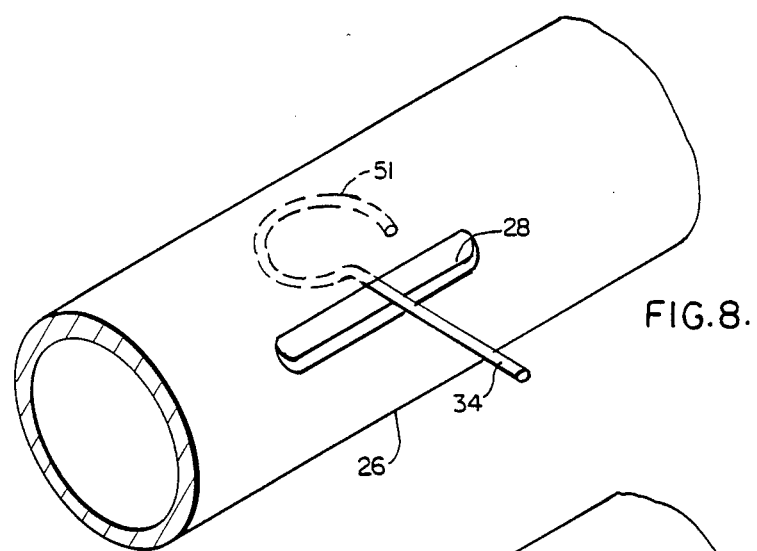
FIG. 8 is a view of the embodiment of FIG. 4 having the one end thereof adapted to be secured within the O-ring.

Installation of The Clips and O-Rings:

A. First Embodiment:

To install the spring clip 32 shown in FIG. 4 within the O-ring 26 such that the O-ring can be secured within the annular groove 24 of the vessel head flange 16, the clip 32 is rotated with respect to its inserted position such that the circular member 51 is generally parallel with the slot 28 in the O-ring 26 and is inserted therein. The spring clip 32 is then twisted or rotated back such that the circular member 51 is generally concentric with the inside diameter of the O-ring 26 (see also FIG. 8). As was stated previously, the effective outer diameter 54 of the circular member 51 is somewhat greater than the inside diameter of the O-ring 26, such that the circular member 51 is thereby compressed to ensure that the clip 32 remains within the O-ring 26.

After the sufficient number of clips 32 have been installed within respective slots 28 within the O-ring, the O-ring 26 is placed in position within the annular groove 24. Then the spring clips 32 are inserted within the threaded holes 30 and are frictionally engaged therein. The clip is inserted until the horizontal member 34 engages the portion 166 of the vessel head flange 16 which separates the aperture 30 and the annular groove 24 to thereby prevent underinsertion. Speed in installation is achieved by the fact that the necessity to install a threaded screw or bolt for each clip has been obviated. The lateral distance from the point 56 where the diagonal member 42 is joined to the inverted V-shaped member 44 to the second contact point 46 which is the terminating point of the inverted V-shaped member 44 is such that it is generally greater than the inside diameter of the threaded hole 30. If necessary, the lateral distance is designed to compensate for any effects on the spring clip resulting from its use within an irradiated environment. This lateral distance is such that adequate friction force between the spring clip 32 and the wall of the threaded hole 30 is provided whereby when the sixteen clips are inserted within their respective threaded holes, the O-ring is adequately secured to the bottom surface 22 of the vessel head flange 16 within its annular groove 24.

To remove the O-ring 26 from the vessel head flange 16, the spring clips 32 can be quickly removed or disengaged from their respective apertures 30. The technician can easily do so by grabbing the U-shaped member 38 by pliers 149 or finger force and pulling the clip downward, and out of engagement with the hole. Since a bolt need not be removed for each clip, which bolt may also become separated therefrom, the removal of the O-ring 26 from its annular groove 24 can also be accomplished more quickly to reduce overall man-rem exposure levels.

B. Second Embodiment:

In order to attach the second type of spring clip 132 to the O-ring 26 so that the O-ring can be secured within the annular groove 24, the following steps are performed:

The horizontally disposed circular member 151 is squeezed such that the second horizontal leg 153 at the terminal end 152 of the circular member 151 is brought closer to the first horizontal leg 134 of the spring clip 132 in order to decrease the distance D between the terminal ends 152, 155 of the circular member 151. Since the distance between these ends is somewhat greater than the length L of the slot 28 within the O-ring 26, after the end 136 of the horizontal member 134 adapted to be secured, within the O-ring 26 is placed therein, the ends 152, 155 of the circular member 151 are released such that the points where the terminal ends 152, 155 of the circular member 151 are joined to their respective horizontal members 153, 134 thereby engage the ends of the slot 28 within the O-ring 26. Since the second terminal end 152 of the circular member 151 and the second horizontal leg 153 thereon is angled at a direction away from the first horizontal member 134, the configuration of the spring clip 132 is such that the clip is secured within the slot 28 of the O-ring 26. The effective diameter 154 of this circular member 151, additionally, is greater than the lateral opening L of the slot 28. After a sufficient number, typically 16, of the clips have been installed within their respective slots, the O-ring is placed within the annular groove 24 and the clips 26 are installed within the threaded hole 30.

In this second design, to easily insert the spring clip 132 within the threaded hole 30, the two generally parallel U-shaped vertical members 138, 148 are squeezed together to thereby decrease the lateral distance, designated at 160, between the point 156 where the diagonal leg 142 is joined to the inverted V-shaped vertical member 144 and the point 146 where the opposite end of the inverted V-shaped vertical member 144 is joined with the vertical leg 145, such that this lateral distance 160 is less than the inside diameter of the threaded hole 30. When the clip 132 has been fully inserted within the threaded hole 30, which can be readily determined by the first horizontal leg 134 engaging the portion 166 of the bottom surface 22 of the vessel head flange 16 which separates the annular groove 24 from the threaded hole 30, the U-shaped vertical legs 138, 148 are released to allow the portion of the spring clip 132 within the hole to expand. At rest, the lateral distance 160 between the ends 156, 146 of the inverted V-shaped member 144 is somewhat greater than any inside diameter of the threaded hole 30 to provide adequate friction force between the spring clip and the threaded hole. When the appropriate number of clips 132 have been installed within the O-ring 26 and threaded holes 30, adequate friction force among the plurality of clips 132 secures the O-ring 26 within its annular groove 34.

When it is necessary to replace an O-ring 26, such as during refueling, the spring clip 132 can be more quickly an easily removed from the threaded hole 30 than prior art devices. The technician need only grab the two U-shaped members 138, 148 and squeeze them together to decrease the lateral distance 160 of the ends of the inverted V-shaped member 144. The spring clips 132 can then be pulled out of engagement with their respective aperture 30, and the O-ring 26 easily removed from the annular groove 24 of the vessel head flange 16 and quickly replaced with a new one. Such simplified and quick procedures for insertion and removal produce the important advantage of reducing technician time within an irradiated environment, and thus reduces overall man-rem exposure.

It is to be understood that the ends of the respective horizontal members adapted to be secured within an O-ring are interchangeable. That is, the circular member thereon can either lie in the horizontal plane parallel with the horizontal member, or can lie in the vertical plane of the horizontal member. Preferably, the spring clip 32, 132 is made from ASTM A580 Type 304 stainless steel or, alternatively, Type 316 stainless steel, both of which are suitable for use in the irradiated environment of a PWR vessel. Also, it is not necessary that the spring clip used in securing an object to the bottom surface of a structure, such as a ceiling, be inserted within a threaded hole. Additionally, in order to increase the friction force between the clip and a hole within which it is inserted, the clip may have a coating, such as with rubber or similar-type material, thereon to increase the coefficient of friction between the clip and the hole. Also, the inverted V-shaped member can, be shaped so as to increase the lateral distance between the terminal ends thereof. With a threaded hole, furthermore, particularly with a larger threaded hole and appropriately sized spring clip, the points on the spring clip that engage the threaded hole can be serrated in order to cooperate with the threads of the threaded hole. This is more desirable with a larger clip since it is much easier to provide the serrations on a larger clip to be inserted with a larger threaded hole. This would increase the holding power of the clip within the threaded hole since the serrations would provide an additional force along with the friction force to secure a clip against a bottom surface of a structure. Additionally, the one end of the horizontal member can be adapted to be attached to any type of object to be secured to the bottom surface of a structure. Such a means for attaching an object to a structure would have numerous uses, well known to one skilled in the art, and need not be individually listed herein. Furthermore, the clip need not be secured to a bottom surface. The clip can be installed within a hole in a vertical wall and project outward therefrom, for example, to hang something from the wall (such as a painting). Thus, the uses of the invention are not limited to the use of securing an O-ring to the bottom surface of an annular flange of a reactor vessel head.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention, which is to be given the full breadth of the appended claims and in any and all equivalents thereof.

What is claimed is:

1. In a nuclear reactor pressure vessel including a vessel closure head having a bottom surface adapted to be sealingly engaged with the pressure vessel, the vessel head having an annular groove therein for receiving a tubular O-ring having a plurality of slots therein, the vessel head also having a plurality of threaded apertures in the bottom surface concentrically disposed with respect to the annular groove, a reactor vessel O-ring spring clip for securing the O-ring to the vessel head, the spring clip comprising a horizontal leg having one end thereof adapted to be received within one of said slots in the O-ring and an opposite end adapted to frictionally engage one of said threaded apertures, such that the weight of the O-ring increases the friction force between the spring clip and said threaded aperture, wherein the one end of the horizontal leg adapted to engage the O-ring includes:
   a generally vertical leg extending upward from the one end of the horizontal leg; and
   a generally circular member depending from the vertical leg such that it lies in a vertical plane parallel with that of the horizontal leg.

2. The reactor vessel as recited in claim 1, wherein the opposite end of the spring clip adapted to frictionally engage one of said threaded apertures is comprised of:
   a U-shaped vertical leg depending downward from the opposite end of the horizontal leg and perpendicularly disposed with respect thereto;
   a diagonally oriented leg extending upward from the U-shaped vertical leg and angled at a direction away from the one end of the horizontal leg adapted to be received within one of said slots; and
   an inverted V-shaped leg extending from the diagonal leg so as to extend in a direction back towards the one end of the horizontal leg, having its end terminating at a vertical position above the plane of the horizontal leg and adapted to be frictionally secured within one of said threaded apertures, such that the diagonal leg and inverted V-shaped leg cooperate to frictionally secure the spring clip within one of said threaded apertures, wherein a plurality of spring clips are used to secure the O-ring to the vessel head within the annular groove.

3. The reactor vessel as recited in claim 1, wherein the opposite end of the spring clip adapted to frictionally engage one of said threaded apertures is comprised of:
   a first U-shaped vertical leg depending downward from the other end of the horizontal leg;
   a diagonal leg extending upward from the first U-shaped vertical leg and angled at a direction away from the one end of the horizontal leg;
   an inverted V-shaped leg extending upward from the diagonal leg so as to extend in a direction back towards the one end of the horizontal leg; and
   a vertical leg depending downward from the inverted V-shaped leg, the vertical leg terminating in a second U-shaped vertical leg which is disposed generally parallel to the first U-shaped leg such that the second U-shaped vertical leg is positioned nearer the one end of the horizontal leg adapted to be received within one of said slots in the O-ring than the other end, whereby the diagonal leg cooperates with said inverted V-shaped and vertical legs to frictionally secure the spring clip within one of said threaded apertures, wherein a plurality of spring clips are used to secure the O-ring to the vessel head within the annular groove.

4. The spring clip as recited in claim 3, wherein the one end of the horizontal leg adapted to engage the O-ring includes:
   a second generally vertical leg extending upward from the one end of the horizontal leg; and
   a generally circular member depending from the second vertical leg such that it lies in a vertical plane parallel with that of the horizontal leg.

5. The spring clip as recited in claim 3, wherein the one end of the horizontal leg adapted to engage the O-ring includes:
   a generally horizontally oriented circular member depending from the one end of the horizontal leg and lying in the horizontal plane thereof, the circular member terminating in a second generally horizontally leg diagonally disposed with respect to the circular member and angled in a direction away from the first horizontal leg, wherein the horizontal distance from the beginning of the circular member to its end is at least as great as the width of one of said slots in the O-ring.

6. In a nuclear reactor pressure vessel including a vessel closure head having a bottom surface adapted to be sealingly engaged with the pressure vessel, the vessel head having an annular groove therein for receiving a tubular O-ring having a plurality of slots therein, the vessel head also having a plurality of threaded apertures in the bottom surface concentrically disposed with respect to the annular groove, a reactor vessel O-ring spring clip for securing the O-ring to the vessel head, the spring clip comprising a horizontal leg having one end thereof adapted to be received within one of said slots in the O-ring and an opposite end adapted to frictionally engage one of said threaded apertures, such that the weight of the O-ring increases the friction force between the spring clip and said threaded aperture, wherein the one end of the horizontal leg adapted to engage the O-ring includes:
- a generally horizontally oriented circular member depending from the one end of the horizontal leg and lying in the horizontal plane thereof, the circular member terminating in a second generally horizontal leg diagonally disposed with respect to the circular member and angled in a direction away from the first horizontal leg, wherein the horizontal distance from the beginning of the circular member to its end is at least as great as the width of one of said slots in the O-ring.

7. The reactor vessel as recited in claim 6, wherein the opposite end of the spring clip adapted to frictionally engage one of said threaded apertures is comprised of:
- a U-shaped vertical leg depending downward from the opposite end of the horizontal leg and perpendicularly disposed with respect thereto;
- a diagonally oriented leg extending upward from the U-shaped vertical leg and angled at a direction away from the one end of the horizontal leg adapted to be received within one of said slots; and
- an inverted V-shaped leg extending from the diagonal leg so as to extend in a direction back towards the one end of the horizontal leg, having its end terminating at a vertical position above the plane of the horizontal leg and adapted to be frictionally secured within one of said threaded apertures, such that the diagonal leg and inverted V-shaped leg cooperate to frictionally secure the spring clip within one of said threaded apertures, wherein a plurality of spring clips are used to secure the O-ring to the vessel head within the annular groove.

8. The reactor vessel as recited in claim 6, wherein the opposite end of the spring clip adapted to frictionally engage one of said threaded apertures is comprised of:
- a first U-shaped vertical leg depending downward from the other end of the horizontal leg;
- a diagonal leg extending upward from the first U-shaped vertical leg and angled at a direction away from the one end of the horizontal leg;
- an inverted V-shaped leg extending upward from the diagonal leg so as to extend in a direction back towards the one end of the horizontal leg; and
- a vertical leg depending downward from the inverted V-shaped leg, the vertical leg terminating in a second U-shaped vertical leg which is disposed generally parallel to the first U-shaped leg such that the second U-shaped vertical leg is positioned nearer the one end of the horizontal leg adapted to be received within one of said slots in the O-ring than the other end, whereby the diagonal leg cooperates with said inverted V-shaped and vertical legs to frictionally secure the spring clip within one of said threaded apertures, wherein a plurality of spring clips are used to secure the O-ring to the vessel head within the annular groove.

9. A spring clip for attaching an object to a bottom surface of a structure having an aperture therein, wherein one portion of the spring clip is adapted to be frictionally engaged within the aperture and an opposite end thereof is adapted to engage the object such that the weight of the object increases the friction force between the spring clip and the aperture, wherein the spring clip is comprised of:
- a horizontal member having one end thereof adapted to engage the object;
- a U-shaped vertical member depending from the other end of the horizontal member;
- a diagonally oriented member depending from the U-shaped member and angled at a direction away from the one end of the horizontal member;
- an inverted V-shaped member depending from the diagonal member so as to extend in a direction back towards the one end of the horizontal member and terminating at a vertical position above the horizontal plane of the horizontal member, such that said diagonal and inverted V-shaped members cooperate to frictionally secure the spring clip within the aperture whereby the object is secured to the bottom surface of the structure; and
- wherein the one end of the horizontal member adapted to engage the object to be secured includes a second generally vertical member depending from the one end of the horizontal member, and a generally circular member depending from the second vertical member such that it lies in a vertical plane parallel with the vertical plane in which the horizontal member lies.

10. A spring clip for attaching an object to a bottom surface of a structure having an aperture therein, wherein one portion of the spring clip is adapted to be frictionally engaged within the aperture and an opposite end thereof is adapted to engage the object such that the weight of the object increases the friction force between the spring clip and the aperture, wherein the spring clip is comprised of:
- a horizontal member having one end thereof adapted to engage the object;
- a U-shaped vertical member depending from the other end of the horizontal member;
- a diagonally oriented member depending from the U-shaped member and angled at a direction away from the one end of the horizontal member;
- an inverted V-shaped member depending from the diagonal member so as to extend in a direction back towards the one end of the horizontal member and terminating at a vertical position above the horizontal plane of the horizontal member, such that said diagonal and inverted V-shaped members cooperate to frictionally secure the spring clip within the aperture whereby the object is secured to the bottom surface of the structure; and
- wherein the object has a plurality of slots therein and the one end of the horizontal member adapted to engage the object to be secured includes a generally horizontal circular member depending from the one end of the horizontal member and lying in the horizontal plane thereof, the circular member terminating in a second generally horizontal leg diagonally disposed with respect to the circular member and angled in a direction away from the first horizontal member, wherein the horizontal distance from the beginning of the circular member to its end is at least as great as the width of one of said slots in the object to be secured.

11. A spring clip for attaching an object to a bottom surface of a structure having an aperture therein, wherein one portion of the spring clip is adapted to be frictionally engaged within the aperture and an opposite end thereof is adapted to engage the object such that the weight of the object increases the friction force between the spring clip and the aperture, wherein the spring clip is comprised of:
- a horizontal member having one end thereof adapted to engage the object;
- a first U-shaped vertical member depending from the other end of the horizontal member;
- a diagonal member depending from the first U-shaped member and angled at a direction away from the horizontal member;
- an inverted V-shaped member depending from the diagonal member so as to extend in a direction back towards the one end of the horizontal member; and
- a vertical member depending from the inverted V-shaped member, the vertical member terminating in a second U-shaped member which is disposed generally parallel with the first U-shaped member and nearer the one end of the horizontal member adapted to engage the object than the other end, such that the diagonal member cooperates with said inverted V-shaped and vertical members to frictionally secure the spring-clip within the aperture whereby the object is secured to the surface of the structure.

12. The spring clip as recited in claim 11, wherein the one end of the horizontal member adapted to engage the object to be secured includes:
- a second generally vertical member depending from the one end of the horizontal member; and
- a generally circular member depending from the second vertical member such that it lies in a vertical plane parallel with the vertical plane in which the horizontal member lies.

13. The spring clip as recited in claim 11, wherein the object has a plurality of slots therein and the one end of the horizontal member adapted to engage the object to be secured includes:
- a generally horizontally oriented circular member depending from the one end of the horizontal member and lying in said horizontal plane thereof, the circular member terminating in a second generally horizontal leg diagonally disposed with respect to the circular member and angled in a direction away from the first horizontal member, wherein the horizontal distance from the beginning of the circular member to its end is at least as great as the width of one of said slots in the object to be secured.

* * * * *